United States Patent
Smith

(10) Patent No.: US 9,238,490 B1
(45) Date of Patent: Jan. 19, 2016

(54) FENDER WELL FAIRING

(71) Applicant: Jeffrey P. Smith, Prosper, TX (US)

(72) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/500,151

(22) Filed: Sep. 29, 2014

(51) Int. Cl.
*B62D 35/00* (2006.01)
*B62D 25/16* (2006.01)

(52) U.S. Cl.
CPC ............... *B62D 35/00* (2013.01); *B62D 25/16* (2013.01)

(58) Field of Classification Search
CPC ..... B62D 25/16; B62D 25/168; B62D 35/001
USPC ......................... 296/180.1, 198; 280/849, 851
See application file for complete search history.

(56) References Cited

U.S. PATENT DOCUMENTS

| | | | |
|---|---|---|---|
| 5,340,154 A * | 8/1994 | Scott | 280/848 |
| 8,523,270 B2 * | 9/2013 | Marlier et al. | 296/180.1 |
| 2013/0096781 A1 * | 4/2013 | Reichenbach et al. | 701/49 |

* cited by examiner

*Primary Examiner* — Joseph D Pape
(74) *Attorney, Agent, or Firm* — Christensen O'Connor Johnson Kindness PLLC

(57) ABSTRACT

An aerodynamic component in the form of, for example, a fairing is provided. The fairing is attached or otherwise positioned at the entry of or within the fender well of the vehicle. In use, the fender well fairing aims to block entry of airflow into the interior area of the vehicle as well as reduces or eliminates direct impingement against interior surfaces of the fender well. This improves air flow, thereby reducing drag.

11 Claims, 4 Drawing Sheets

FENDER WELL FAIRING

BACKGROUND

Numerous means have been sought to improve the fuel-efficiency of moving bodies and, especially, moving bluff bodies by reducing their aerodynamic drag. In the field of surface transportation and, particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

Most large long-haul tractors exhibit less than optimal aerodynamic performance during highway operation. At highway speeds, these conventional vehicles develop a substantial amount of turbulent airflow in and around various locations of the vehicle. One such location is the wheel openings define between the fender well and the tires. This area allows airflow, and especially cross flow, to impinge upon interior surfaces of the vehicle, thereby producing turbulent flow. This turbulence results in significant aerodynamic drag, increasing both fuel consumption and Nitrogen Oxide (NOx) emissions of the tractor.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, a drag reducing system is provided for a vehicle having at least one wheel. The system includes a vehicle fender defining a fender well and an opening to the fender well, and a fairing positioned adjacent the opening and projecting inwardly toward the wheel.

In accordance with another aspect of the present disclosure, a vehicle is provided. The vehicle includes a fender defining a fender well and an opening to the fender well, a wheel having top, front, and aft sides disposed within the fender well a spaced distance from the fender, and a fairing positioned adjacent the opening and projecting inwardly toward the wheel to within about two (2) inches from the front and aft sides, and about three (3) inches from the wheel.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of devices or components for improving the aerodynamic efficiency (e.g., reduce drag) of vehicles, such as class 8 tractors, combinations, etc. To improve the aerodynamic efficiency of a vehicle, examples described herein provide one or more aerodynamic components positioned thereon. In some examples described herein, the one or more aerodynamic components are in the form of fairings that attach or are otherwise positioned at the entry of or within the fender well of the vehicle. In use, the fender well fairing aims to block entry of airflow into the interior area of the vehicle as well as reduces or eliminates direct impingement against interior surfaces of the fender well. This improves air flow, thereby reducing drag. The devices or any combination of components hereinafter described may be installed on new vehicles, or may be retrofitted on existing vehicles.

Although embodiments of the present disclosure will be described with reference to a Class 8 tractor, one skilled in the relevant art will appreciate that the disclosed embodiments are illustrative in nature, and therefore, should not be construed as limited to a Class 8 tractor and their front and/or tandem fenders, etc. It should therefore be apparent that the disclosed systems and components thereof have wide application, and therefore, may be suitable for use with many types of powered vehicles, such as passenger vehicles, buses, RVs, commercial vehicles, light and medium duty vehicles, and the like, as well as non-powered vehicles, such as cargo trailers, flatbed trailers, etc., and the like. Accordingly, the following descriptions and illustrations herein should not limit the scope of the claimed subject matter.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
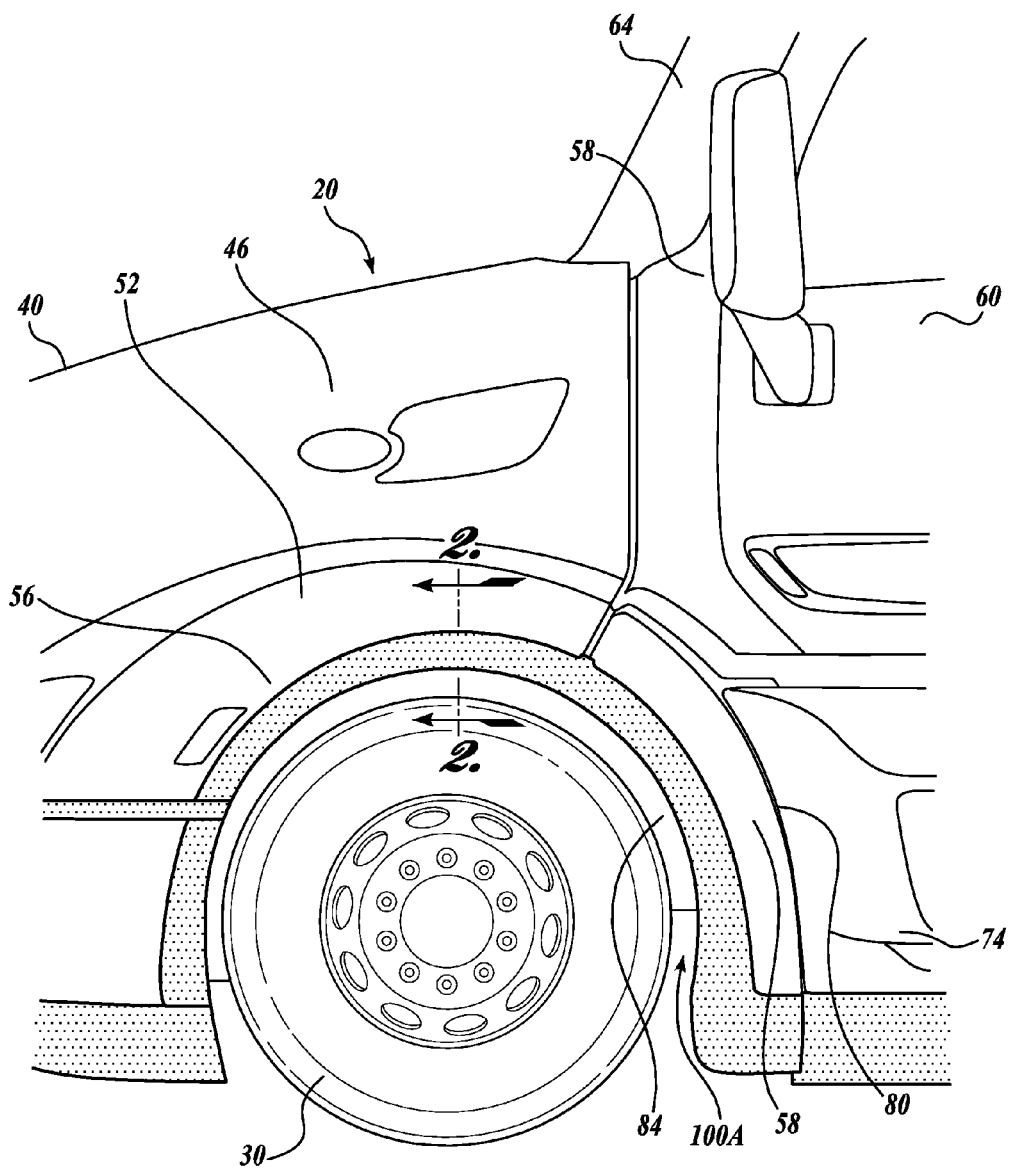
FIG. 1 is a partial view of a vehicle incorporating one example of a drag reducing device in accordance with aspects of the present disclosure.

FIG. 1 is a partial view of a left side of a vehicle, such as tractor 20, employing one example of a fender well fairing, generally denoted 100, constructed in accordance with aspects of the present disclosure. Before describing the various aspects of the fender well fairing 100, the tractor 20 will be described in some detail. As shown in FIG. 1, the tractor 22 comprises a chassis (hidden in FIG. 1) supported by wheels 30 of a front wheel assembly. The wheels 30 are connected to the chassis via drag producing components including conventional axles and suspension assemblies (not shown).

A front section 40 of the vehicle 20 is supportably mounted on the chassis, as shown in FIG. 1. The front section 40 includes a hood 46 that generally covers a block-like shaped engine compartment housing an internal combustion engine that propels the tractor. In the embodiment shown, the hood 46 is integrally formed with fenders 52, which define wheel or fender wells 54 (FIG. 2) that house the wheels 30. The fender 52 in this example may be formed by separate parts, including hood fender section 56 and rear fender section 58. The fender 52 may include an integrally formed headlamp assemblies and side turn indicators (not shown).

The tractor 22 also includes a cab section 58 supportably mounted on the chassis rearwardly of the front section 40. The cab section 58 generally includes vertically oriented driver and passenger doors 60, a roof (not shown in FIG. 1), a windshield 64, and an optional sleeper section (not shown) that together forms a compartment that houses driver and passenger seats, a dashboard with various gages, telematics, system controls, etc., a steering wheel for affecting the direction of the wheels 30, and sleeping quarters if the optional sleeper section is included.

In the embodiment shown, the cab section 58 includes various aerodynamic devices, such as fairings, to improve the aerodynamics of the tractor. Examples of such fairings may include one or more chassis fairings that aid in covering one or more structural aspects of the tractor, such as the gas tank, storage boxes, etc. The fairings provide improved air flow, and aid in inhibiting air flow underneath the chassis. In the embodiment shown in FIG. 1, the one or more chassis fairings may include a front chassis fairing 74. The front chassis fairing 74 in some embodiments includes integrated steps for cab ingress/egress. Additional fairings, such as rear or quarter fender fairings 80, may be provided or integrally formed with the front chassis fairing 74. In the embodiment shown, the rear fender fairing 80 forms the rear fender section 58, described briefly above.

FIG. 1 also shows one example of a left-side fender well fairing 100A of the present disclosure, which is mounted or otherwise positioned adjacent the underside of the fender 52. It should be noted that the structures and arrangements of the depicted left-side fender well fairing 100A can be a mirror of the right-side components (not shown). It is noted that the drawings and descriptions of the left-side fender well fairing 100A are equally applicable to the embodiments at both sides of tractor 22. Generally described, once mounted the left-side fender well fairing 100A extends peripherally around the lower ledge or lip of the fender 54 or portions thereof. The fender well fairing 100 can be mounted to any component of the tractor in order to be disposed adjacent to and to extend below the fender. In the embodiment shown, the fairing 100 is fastened, bonded, molded or otherwise mounted to the free end of the fender 52, such as the fender's outermost edge or lip that defines the fender well opening 84. In some embodiments, the fairing 100 extends the entire perimeter of the fender 100, while in other embodiments the fairing 100 extends only portions thereof. Further, while the fender well fairing 100 is illustrated as being mounted or otherwise disposed adjacent the front wheel fenders 52, the fender well fairing 100 in some embodiments is additionally or alternatively mounted or otherwise disposed adjacent to the rear wheel fenders (not shown).

Figure 2:
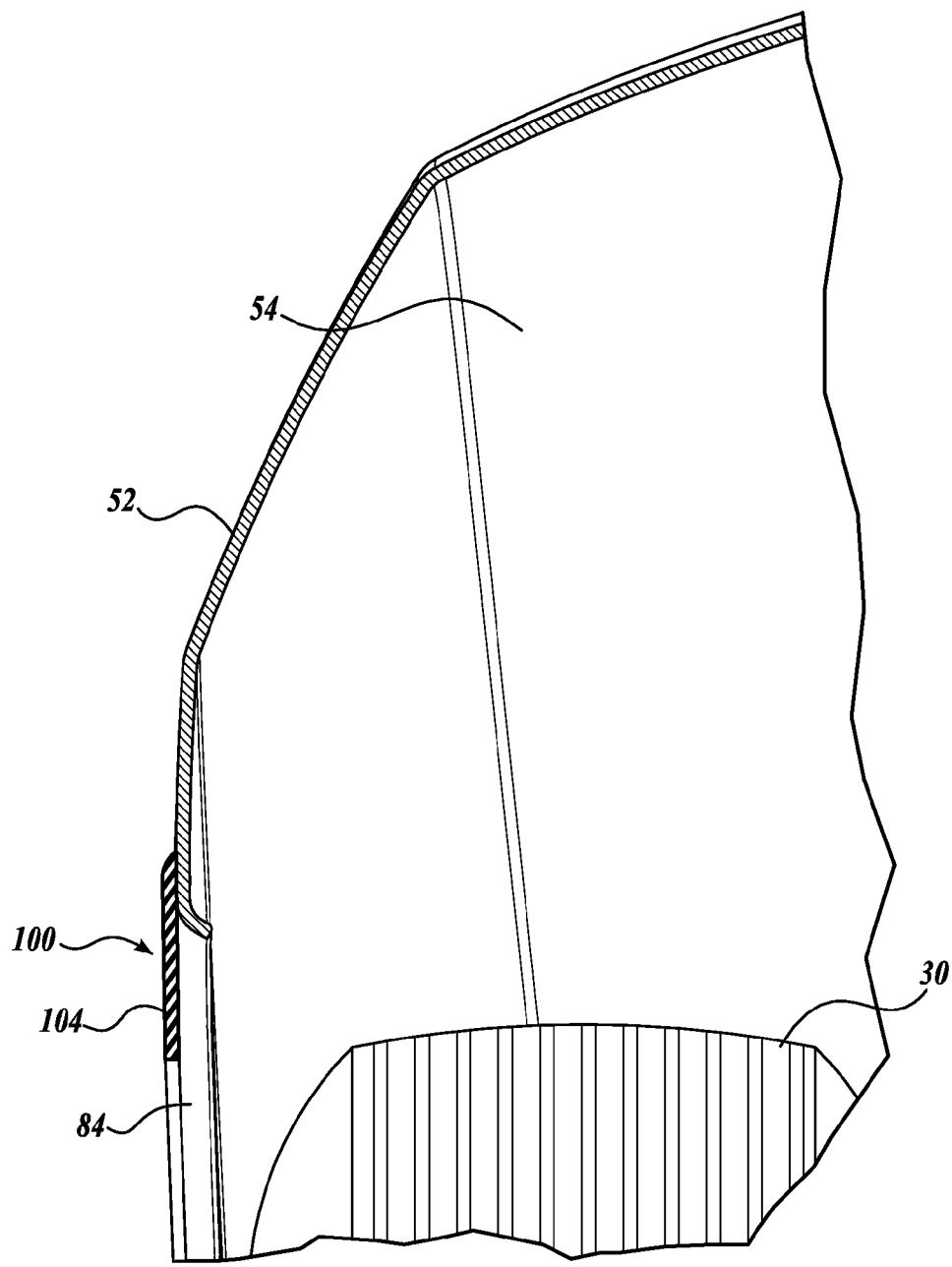
FIG. 2 is a cross sectional view taken along lines 2-2 of FIG. 1.
Figure 3:
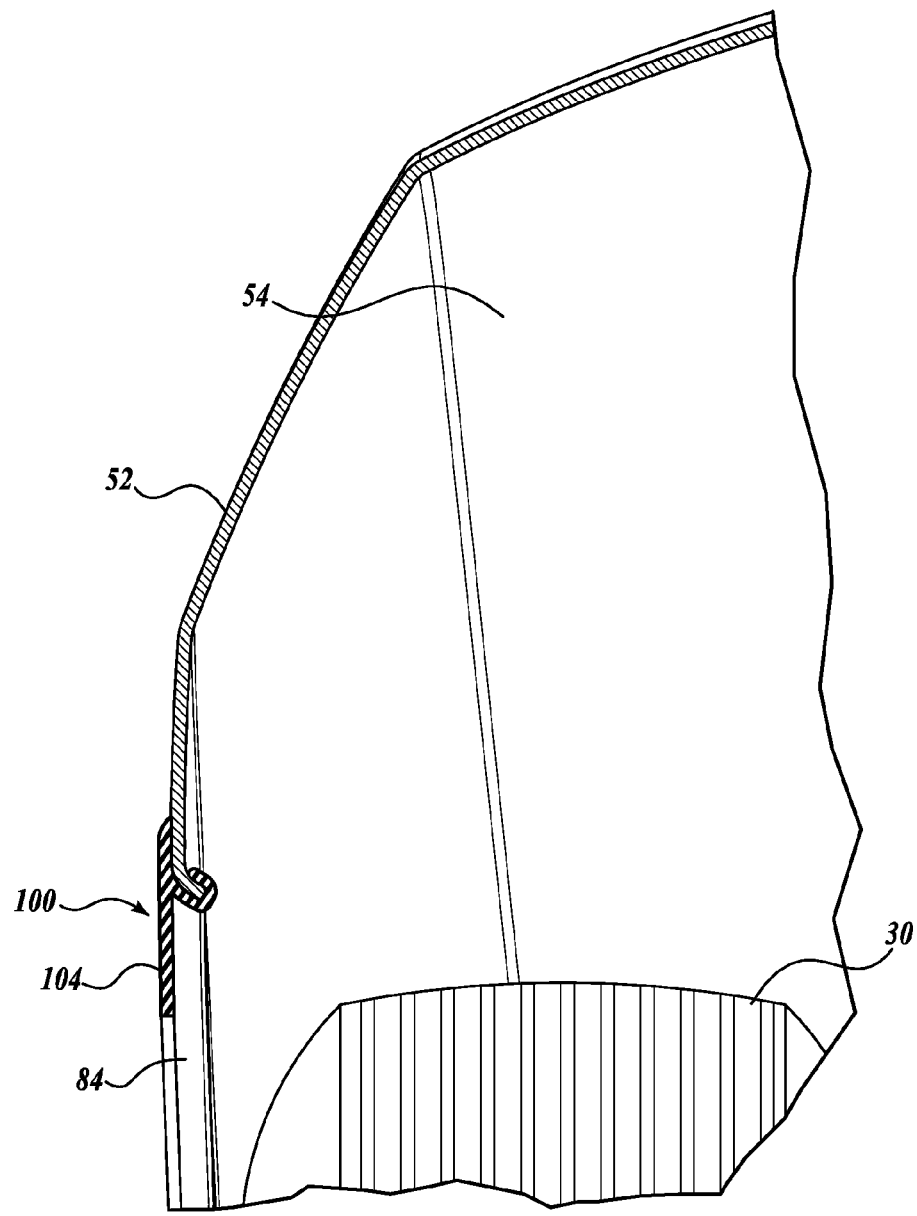
FIG. 3 is a cross-section view of another embodiment of the drag reducing device in accordance with aspects of the present disclosure.
Figure 4:
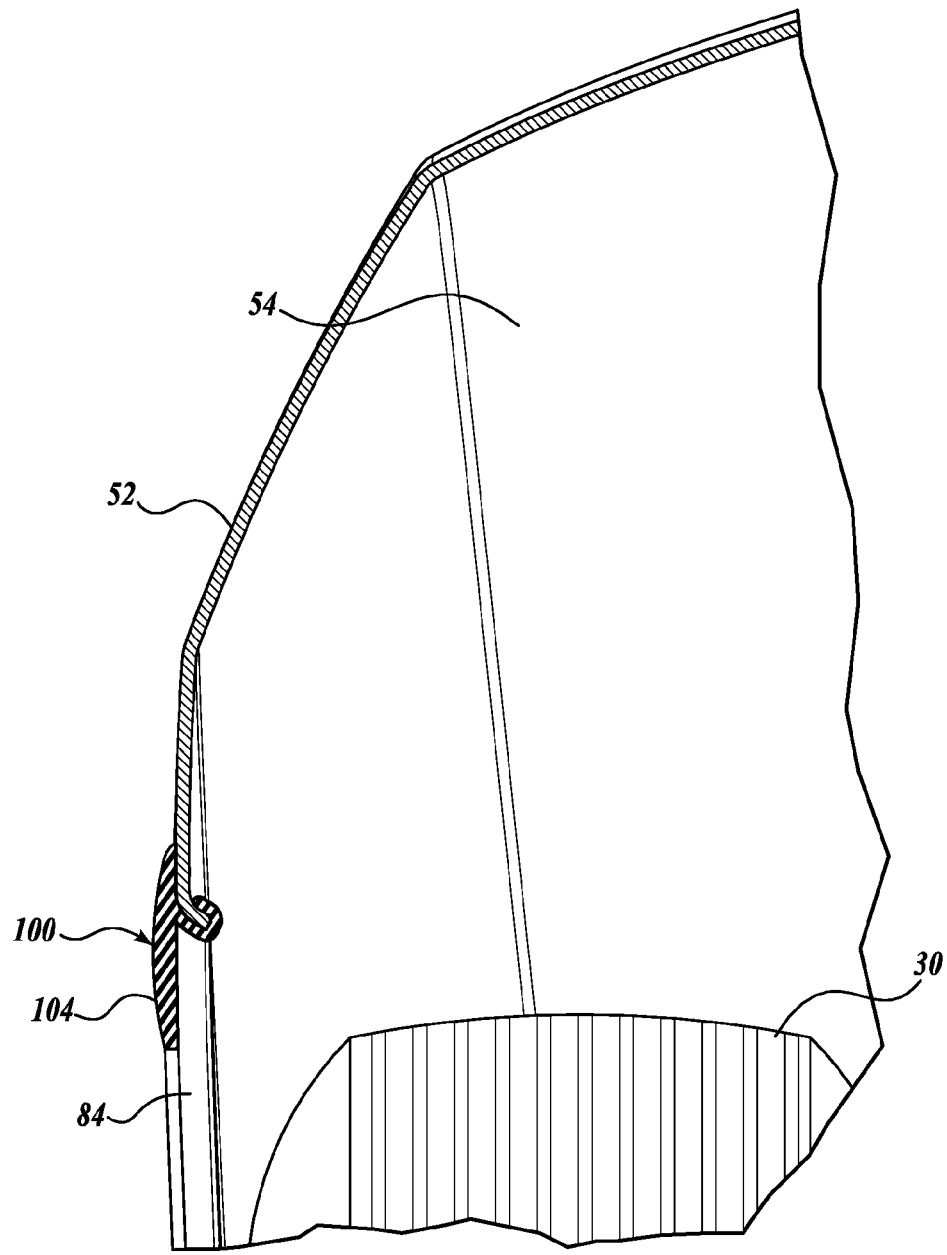
FIG. 4 is a cross-section view of yet another embodiment of the drag reducing device in accordance with aspects of the present disclosure.

Turning now to FIG. 2, there is shown one example of the fender well fairing 100 mounted or otherwise positioned to project generally laterally into the fender well opening 84. In cross-section, the fairing 100 is generally plate-like, having an outwardly facing generally planar contact surface 104. In other embodiments, the fairing 100 may be more block-like in cross-section to provide more rigidity, if desired. In yet other embodiments, the outwardly facing surface 104 can be generally curved, as shown in FIG. 4. In these embodiments or others, the fairing 100 may include a fender interface configured to couple the fairing 100 to the fender 54 in either a removable or non-removable manner, as shown in FIGS. 3 and 4. In the embodiment shown, the fairing 100 extends generally parallel with the tire, although other embodiments may be practiced with embodiments of the present disclosure. For example, the outward or free end section of the fairing 100 can curve or taper slightly inwardly into the fender well. The start of the taper of curve can be located anywhere along the fairing 100.

In the embodiment shown, the fairing 100 is positioned on the exterior side of the fender 52. It will be appreciated that the fairing 100 can be position on the interior side of the fender 52 as well.

In the embodiment of FIGS. 1 and 2, the fender well fairing 100 is positioned at the outward most portion of the fender 52, such as the outer edge or lip of the fender sections 56 and 58. In other words, the fender well fairing 100 is positioned at the opening 80 of the fender well 54 and projects laterally therein. In accordance with an aspect of the present invention, the fairing 100 extends laterally toward the wheel 30 to a position almost touching the wheel 30 in order to maximize the drag reducing effects. In some embodiments, the fairing 100 projects laterally into the opening 84 (towards the wheel 30) a constant distance as the fairing extends around the perimeter of the fender 52 or portions thereof. In other embodiments, the fairing 100 projects laterally into the opening (towards the wheel 30) a non-constant distance as the fairing 100 extends around the perimeter of the fender or portions thereof. These latter embodiments may provide more airflow contact area in order to block airflow while minimizing possible interference with the wheel during operation of the vehicle. This may be desirable when the outer perimeter of the fender 54 does not correspond in geometry with the wheel 30.

In some embodiments, the fender well fairing 100 may project laterally into the opening 84, for example, to between about one (1) to two (2) inches from the front and aft sides of the wheel 30 and between about two (2) and four (4) inches from the top side of the wheel 30. In other embodiments, the fender well fairing 100 may project laterally into the opening 84, for example, to about one and a half (1.5) inches or less at the front and aft sides of the wheel 30 and three (3) inches or less from the top side of the wheel 30. In yet other embodiments, the fender well fairing 100 may project laterally into the opening 84, for example, to between about two (2) to four (4) inches or less from the front, aft, and top sides of the wheel 30.

The fairing 100 can either be flexible or semi-rigid, and is constructed in some embodiments out injected molded synthetic or natural rubber, Thermoplastic Polyolefin (TPO) or other similar thermoplastics. The use of such compliant materials can provide some "give" to the fairing if struck by the wheel or road debris, limiting potential damage to the fairing. In other embodiments, the fairing 100 can be constructed out of aluminum, steel, fiberglass, among others. In some embodiments, the outer perimeter of the fairing 100 can be formed with an inwardly rolled or turned lip (not shown).

Once installed, and with the vehicle, such as tractor 20, moving in a forward direction, the fairing 100 experiences air flow in the opposite direction of the forward movement of the vehicle. In this regard, the fairing 100 provides improved air flow by at least blocking some airflow from entering the fender well area of vehicle, thereby reducing drag. In some embodiments, as the vehicle moves in a forward direction, the vehicle is subject to off-axis air flow including but not limited to cross winds oriented at a yaw angle from the longitudinal axis of the vehicle. In this regard, the configuration of the fairing 100 improves the air flow characteristics of the associated vehicle by both reducing air flow into the undercarriage area of the vehicle via the fender well as well as potentially reducing direct impingement of air flow against the forward facing surfaces of the fender well.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A drag reducing system for a vehicle having at least one wheel, comprising:
   a vehicle fender defining a fender well and an opening to the fender well associated with each at least one wheel; and
   a fairing positioned adjacent the opening, wherein the fairing projects into the opening to between about one (1) and (2) inches from the front and aft sides of the at least one wheel and between about two (2) and four (4) inches from the top side of the at least one wheel.

2. The system of claim 1, wherein the fairing extends along the entire perimeter of the fender.

3. The system of claim 1, wherein the fairing extends along portions of the perimeter of the fender.

4. The system of claim 1, wherein the fairing projects into the opening a constant distance.

5. The system of claim 1, wherein the fairing projects into the opening to within about one and a half (1.5) inches at the front and aft sides of the at least one wheel and to within three (3) inches or less from the top side of the at least one wheel.

6. The system of claim 1, wherein the fairing defines an outwardly facing generally planar surface.

7. The system of claim 1, wherein the fairing defines an outwardly facing generally curved surface.

8. The system of claim 7, wherein the outwardly facing generally curved airflow contact surface is a convex curved surface.

9. The system of claim 1, wherein the fairing comprises a fender interface configured to couple the fairing to a lip of the fender.

10. The system of claim 9, wherein the fender interface is located on an inner side of the fairing.

11. The system of claim 1, wherein the fairing projects a non-constant distance as the fairing extends around the perimeter of the fender.

\* \* \* \* \*